United States Patent [19]
Phillips

[11] Patent Number: 5,945,180
[45] Date of Patent: Aug. 31, 1999

[54] VARIABLE DECORATIVE TREATMENT

[76] Inventor: Catherine C. Phillips, 8N106 Citation Ct., St. Charles, Ill. 60175

[21] Appl. No.: 08/903,228

[22] Filed: Jul. 22, 1997

[51] Int. Cl.⁶ .................................................. B32B 3/10
[52] U.S. Cl. ............................ 428/14; 428/38; 428/542.8
[58] Field of Search ........................... 428/14, 38, 542.8; 52/204.593, 311.1

[56]           References Cited

U.S. PATENT DOCUMENTS

| | | | |
|---|---|---|---|
| D. 367,886 | 3/1996 | Dutton, Jr. ................................ | D19/40 |
| 776,441 | 11/1904 | Veyon ................................. | 52/311.1 X |
| 1,199,893 | 10/1916 | Herrmann ............................... | 52/311.1 |
| 1,361,501 | 12/1920 | Schepmoes ............................. | 52/591.3 |
| 2,185,335 | 1/1940 | Fischer ................................. | 52/311.1 X |
| 3,307,316 | 3/1967 | Gray ..................................... | 52/507 |
| 3,440,786 | 4/1969 | Weaver .................................. | 52/780 |
| 4,060,950 | 12/1977 | Rackard et al. ........................ | 52/456 |
| 4,074,490 | 2/1978 | Nagase .................................. | 52/312 |
| 4,115,972 | 9/1978 | Varlonga ............................ | 52/204.593 |
| 4,411,855 | 10/1983 | Fiebig, Jr. et al. .................. | 428/38 X |
| 5,123,211 | 6/1992 | Schlicht et al. .......................... | 52/202 |
| 5,418,021 | 5/1995 | Kim ......................................... | 428/14 |
| 5,450,702 | 9/1995 | Barnett .................................. | 428/14 X |
| 5,465,774 | 11/1995 | Smith ..................................... | 428/14 X |
| 5,469,683 | 11/1995 | McKenna et al. ........................ | 52/235 |
| 5,477,647 | 12/1995 | Yates, Jr. ............................... | 52/314 X |

Primary Examiner—Henry F. Epstein
Attorney, Agent, or Firm—Wood, Phillips, VanSanten, Clark & Mortimer

[57]              ABSTRACT

A decorative window assembly including a frame having spaced apart frame elements between which a display space is defined, a first element having a first appearance, and a receptacle and projection defined on each of the frame and first elements cooperating to removably maintain a first element in a first predetermined relationship at a first location on the frame. A second element having a second appearance is also provided, with a receptacle and projection defined on each of the frame and second elements cooperating to removably maintain the second element in a second predetermined relationship at the first location on the frame. The first and second elements can be selectively interchangeably displayed at the first location to selectively change the overall appearance of the decorative window assembly.

17 Claims, 7 Drawing Sheets

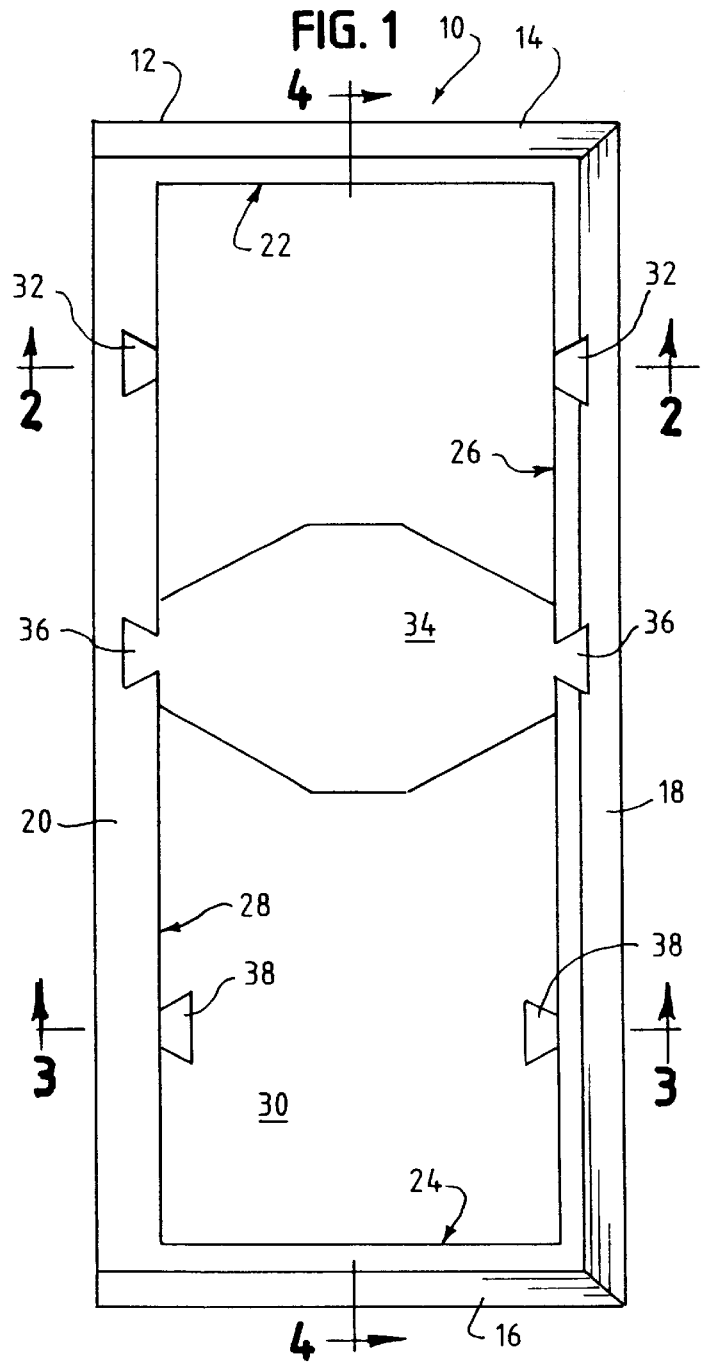
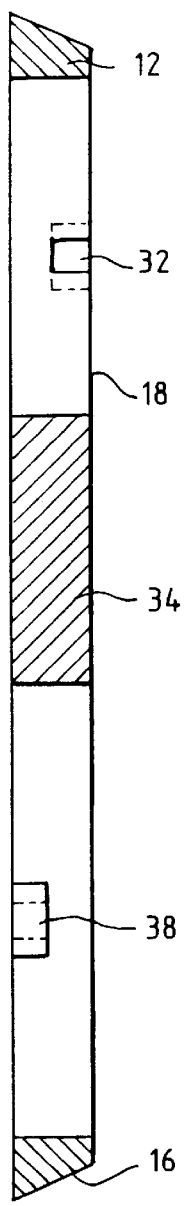
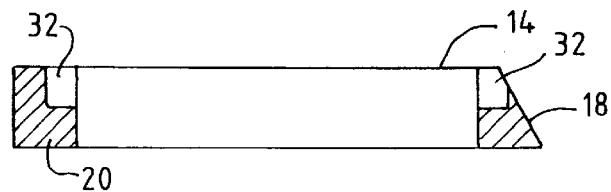
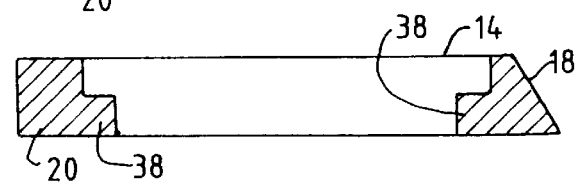

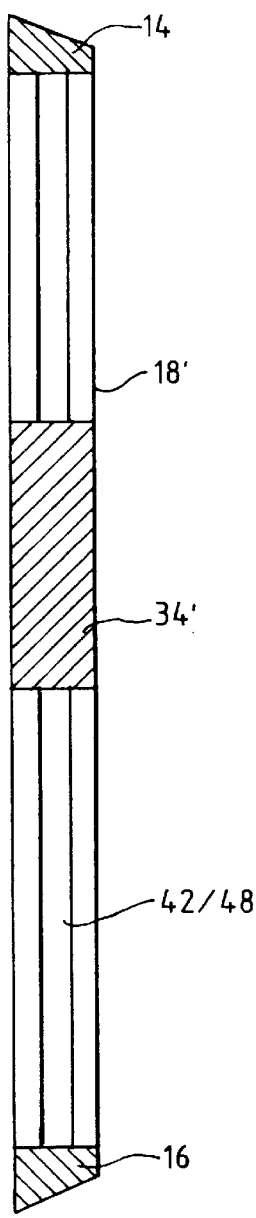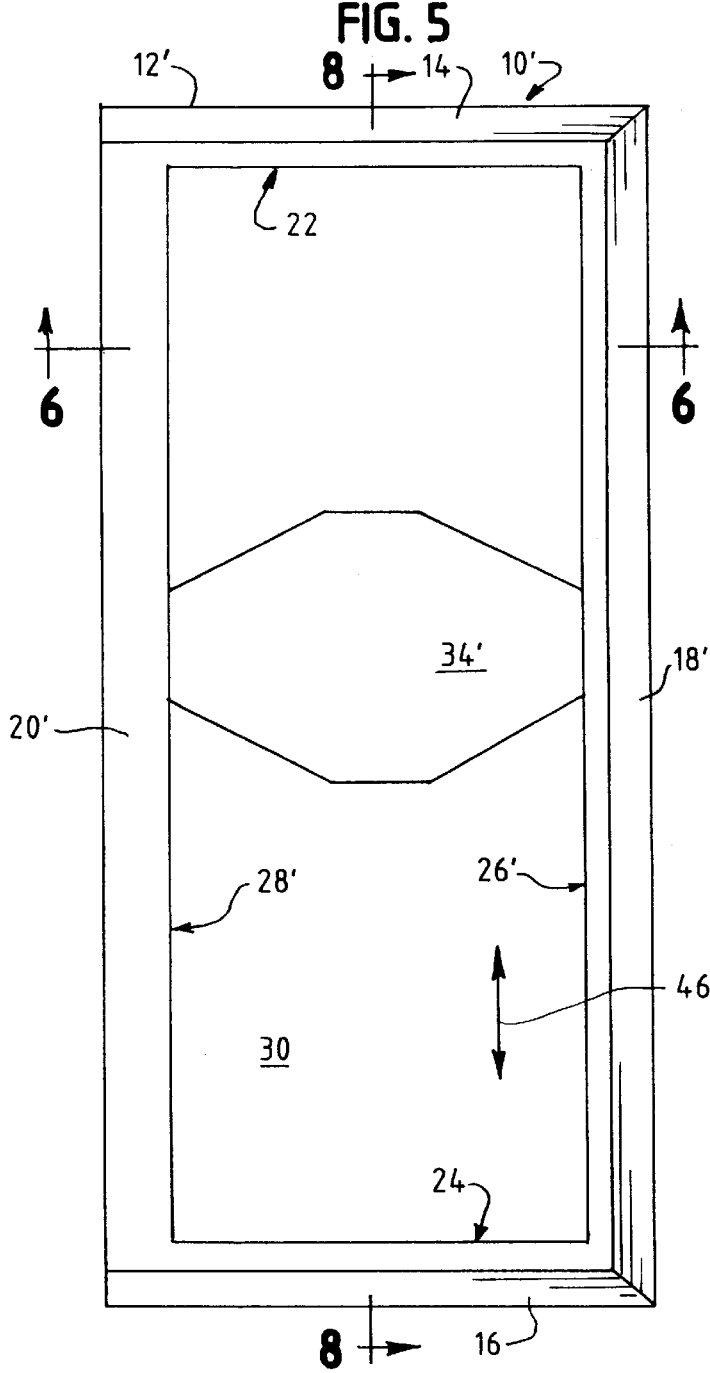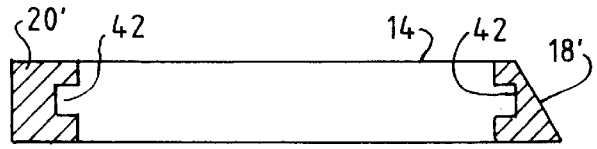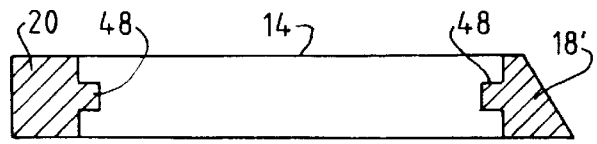

5,945,180

VARIABLE DECORATIVE TREATMENT

BACKGROUND OF THE INVENTION

1. Technical Field

The present invention is directed to a decorative treatment, as for windows, and, more particularly, to a decorative treatment having interchangeable elements.

2. Background Art

Windows are placed in all types of buildings permitting external light to illuminate a room and also allowing the occupant to view the outside. While windows are generally designed to be primarily functional in nature, many residential building owners, and some commercial building owners, desire their windows to be aesthetically pleasing as well as functional. In a commercial setting, this helps to maintain a pleasant, relaxed working environment, presumably boosting the morale of the employees and increasing the quantity and quality of their work. In a residential setting, aesthetically pleasing windows add a sense of personality and warmth to the home.

Leaded and bevelled glass are two examples of materials used to give windows an aesthetically pleasing appearance. Further, grid systems have been developed which are mounted inside a double window pane unit and securely hold decorative art glass panes in place. However, a drawback with the above examples is that they may not permit a home owner to readily and easily change the decorative appearance of the window. A home owner may wish to change the decorative features of his/her windows in accordance with the holidays or the changing seasons, or simply because he/she feels like it.

SUMMARY OF THE INVENTION

A decorative window assembly is provided including a frame having spaced apart frame elements between which a display space is defined, a first element having a first appearance, and a receptacle and projection defined on each of the frame and first elements cooperating to removably maintain the first element in a first predetermined relationship at a first location on the frame. A second element is also provided having a second appearance, with a receptacle and projection defined on each of the frame and second elements cooperating to removably maintain the second element in a second predetermined relationship at the first location on the frame, whereby the first and second elements can be selectively interchangeably at the first location to selectively change the overall appearance of the frame.

In one form of the present invention, the receptacle and projection defined on each of the frame and first and second elements includes a dove-tail connection between the frame and first and second elements.

In another form of the present invention, the spaced apart frame elements include a plurality of receptacles/projections defined thereon at predetermined locations along their respective lengths. The first and second elements each have a pair of projections/receptacle, whereby the first and second elements can be selectively interchangeably displayed at any of the predetermined locations to change the overall appearance of the frame.

In still another form of the present invention, the spaced apart frame elements have opposing inner surfaces defining the display space, with each opposing inner surface having a channel extending lengthwise along the respective frame element. The first and second elements each have a pair of flanges removably receivable in the channels for guided sliding translatory movement of the first and second elements in the display space relative to the frame.

In still another form of the present invention, the first and second elements are snap-fit to the frame.

In still another form of the present invention, a window is provided having inner and outer surfaces, with the frame attached to the inner surface of the window.

It is an object of the present invention to provide a decorative window assembly with readily interchangeable decorative features.

It is a further object of the present invention to provide a decorative window assembly permitting a home owner to custom decorate their windows.

It is a further object of the present invention to provide an easy to install decorative window assembly.

Other aspects, objects and advantages of the present invention can be obtained from a study of the application, the drawings, and the appended claims.

BRIEF DESCRIPTION OF THE DRAWINGS

FIG. 1 is a front elevation view of a first embodiment of the decorative assembly of the present invention, including a frame and an exemplary display element;

FIG. 2 is a cross-sectional view taken along line 2—2 in FIG. 1;

FIG. 3 is a cross-sectional view taken along line 3—3 in FIG. 1;

FIG. 4 is a cross-sectional view taken along line 4—4 in FIG. 1;

FIG. 5 is a front elevation view of a second embodiment of the decorative assembly of the present invention, including a frame and an exemplary display element;

FIG. 6 is a cross-sectional view taken along line 6—6 in FIG. 5;

FIG. 7 is a cross-sectional view similar to that shown in FIG. 6, but including a modification to the frame;

FIG. 8 is a cross-sectional view taken along line 8—8 in FIG. 5;

DETAILED DESCRIPTION OF THE PREFERRED EMBODIMENTS

Figure 9:
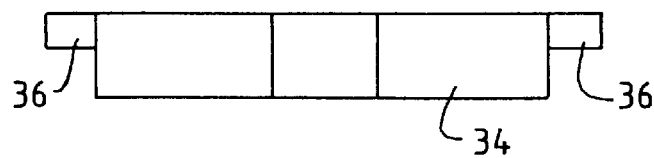
FIG. 9 is a side elevation view of a first embodiment of the decorative element.

With reference to FIGS. 1–4, one form of decorative assembly, according to the present invention, is shown generally at 10. The assembly 10 includes a frame 12 defined by elongate side elements 14,16,18,20. The frame elements 14,16,18,20 are joined at their ends, with the elements 14 and 16 spaced and parallel to one another and the elements 18 and 20 spaced and parallel to one another, to define generally a rectangular configuration. However, it should be understood that other geometric configurations of the frame 12 are also contemplated. The frame elements 14,16,18, 20 include inner surfaces 22,24,26,28, respectively, which define a display space 30. A plurality of dove-tail shaped receptacles 32 are formed in the frame elements 18 and 22 at predetermined locations along their lengths. A display element 34 (see FIG. 9) performing primarily a decorative function, is disposed in the display space 30 and includes spaced dove-tail shaped projections 36 complementary to and receivable one each in the receptacles 32 formed in the frame elements 18 and 20. By directing the projections into the receptacles 32 at selected locations along the length of the frame element 18,20, the display element 34 may be press-fit into a predetermined relationship with the frame 1 2 at any of the plurality of predetermined locations established by the positions of receptacles 32.

Figure 10:
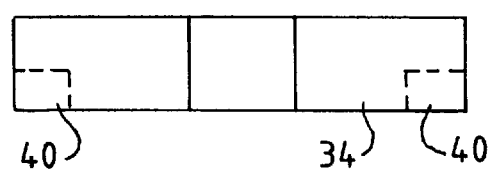
FIG. 10 is a side elevation view of a second embodiment of the decorative element.

Alternatively, the receptacles 32 may be replaced with dove-tail shaped projections 38 projecting from the inner surfaces 26,28 of frame elements 18,20. Of course, if the frame elements 18,20 include projections 38, the display element 34 (see FIG. 10) would need to be modified to include dove-tail shaped receptacles 40 replacing the projections 36. As before, the display element 34 would simply be press-fit to the frame 12 and held in place by the cooperating projections 38 and receptacles 40 on the frame elements 18,20 and display element 34.

While the display element 34 is depicted as having a non-transparent, geometric configuration, it should be understood, and will become more readily apparent, that other design configurations for the display element 34 are also contemplated. Moreover, it should be understood, and will become more readily apparent, that the decorative assembly 10 of the present invention is designed to be utilized with a plurality of display elements 34, which may be selectively interchangeably mounted at any of the predetermined locations as determined by the receptacles 32/projections 38 on the frame 12.

Figure 11:
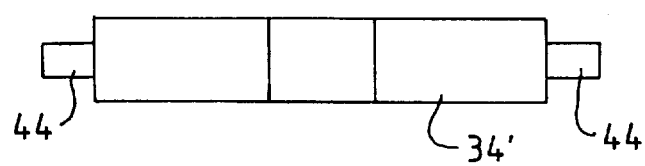
FIG. 11 is a side elevation view a third embodiment of the decorative element.

Referring now to FIGS. 5–8, a second embodiment of the decorative assembly 10' of the present invention is shown, with like elements having the same reference number and elements which correspond but have been slightly modified indicated with a prime ('). Frame elements 18' and 20' have been modified to include channels 42 formed on their inside surfaces 26' and 28', respectively, with the channels 42 extending generally the entire length of the frame elements 18',20'. The display element 34' has been modified (see FIG. 11) to include projections 44 extending peripherally therefrom. Preferably, the display element 34' is made of a resilient material and is snap-fit to the frame 12' in the display space 30. The projections 44 on the decorative element 34' are received in channels 42 on the frame elements 18',20' and maintain the decorative element 34' within the frame 12' in a predetermined relationship while allowing guided sliding translatory movement of the decorative element 34' in the directions of arrow 46 relative to the frame 12'.

Figure 12:
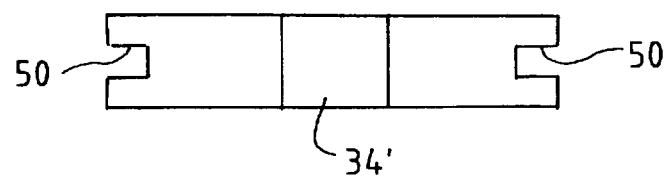
FIG. 12 is a side elevation view of a fourth embodiment of the decorative element.

Alternatively, as shown in FIG. 7, a raised rib 48 may be formed on the inner surfaces 26',28' of the frame elements 18',20', replacing the channels 42. In this embodiment, the decorative element 34' (see FIG. 12) would include slots 50 replacing the projections 44. Assembly and movement of the decorative element 34' would be accomplished in the same manner as before.

Figure 13:
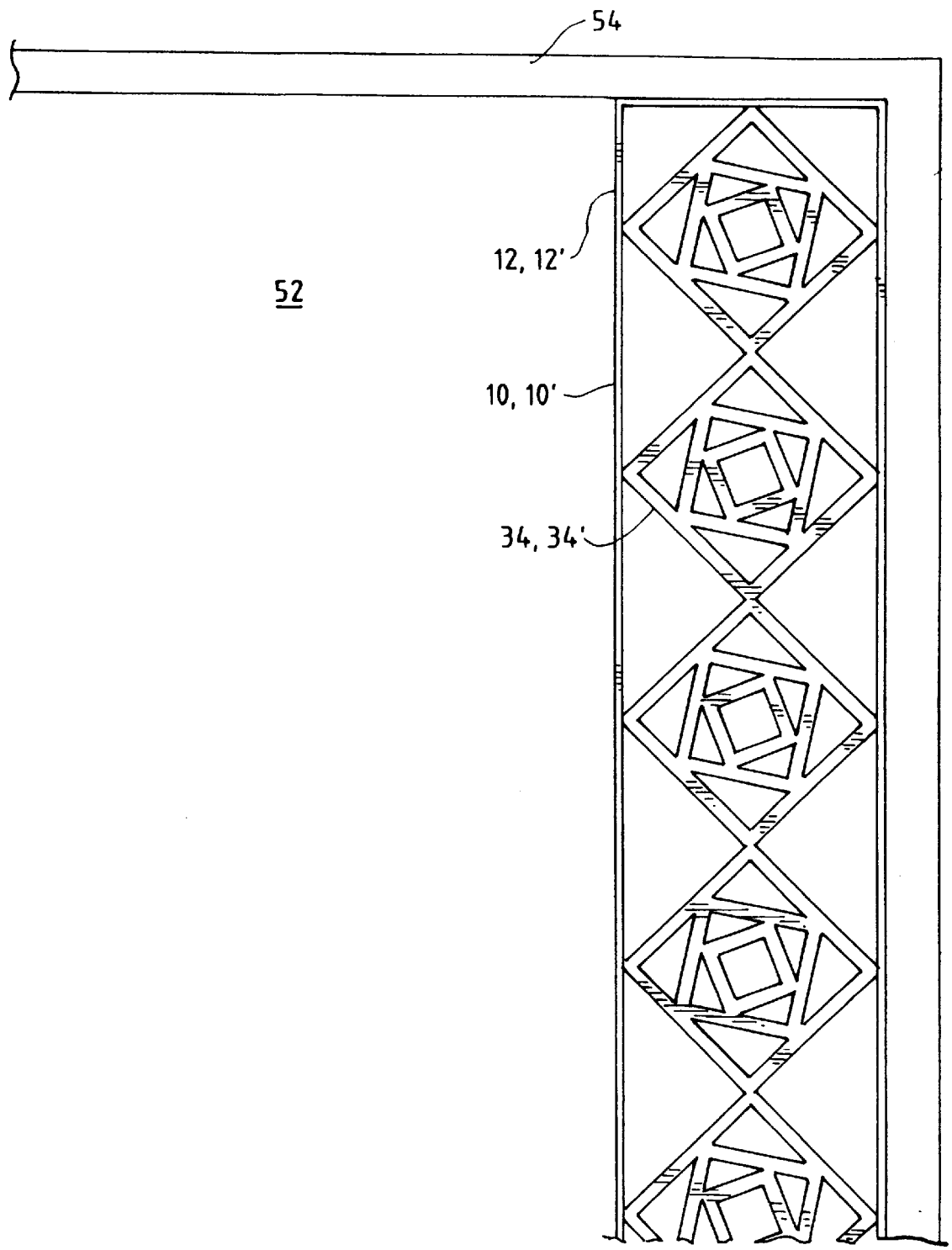
FIG. 13 is a fragmentary front elevation view of the decorative window assembly attached to a window frame, depicting an exemplary decorative design consideration.
Figure 14:
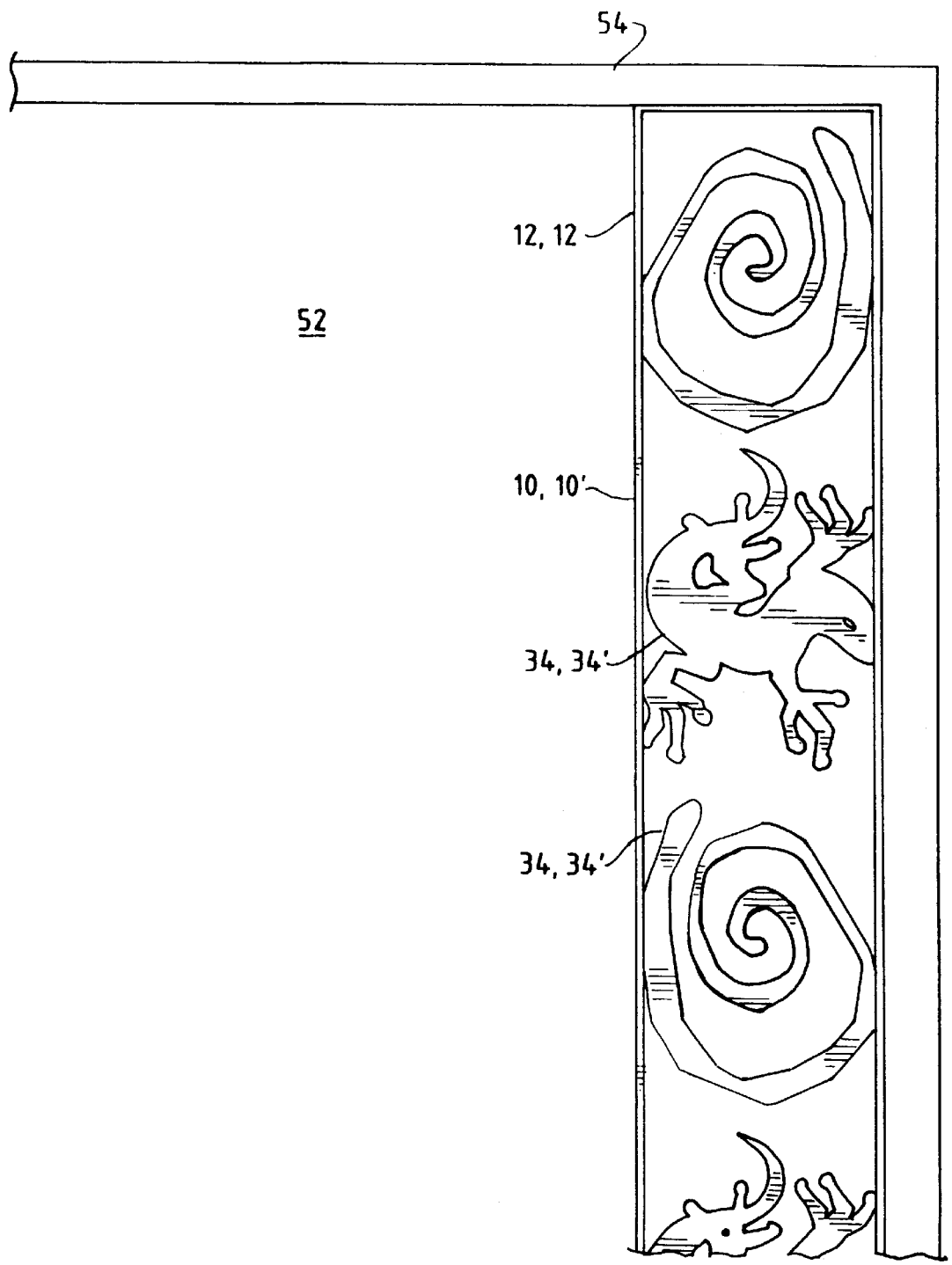
FIG. 14 is a fragmentary front elevation view of the decorative window assembly attached to a window frame, depicting an alternative decorative design consideration.

FIGS. 13–14 depict two (2) of the virtually infinite design configurations for the decorative window assembly 10,10' of the present invention. For instance, FIG. 13 depicts the decorative assembly 10,10' attached to an interior surface of a window shown generally at 52. The assembly 10,10' is attached along the edge of the window 52 near the frame 54, and may be attached via any conventional mounting means.

The design configuration shown in FIG. 13 depicts a plurality of similarly configured geometric shapes used as the decorative elements 34,34'. Whereas in FIG. 14, alternating design configurations are utilized for the decorative elements 34,34'. It should be noted that the design configurations depicted in FIGS. 13 and 14 can be utilized with either embodiment of the decorative assembly 10,10'. That is, the display elements 34,34' may be attached to the frame 12,12' via cooperating projections and receptacles whereby the display elements 34 would be releasably held in fixed predetermined locations along the frame 12, or alternatively, the display elements 34' may be mounted to the frame via cooperating channels and ribs, whereby the guided sliding translatory movement of the decorative elements 34' with respect to the frame 12' could be effectuated.

Figure 15:
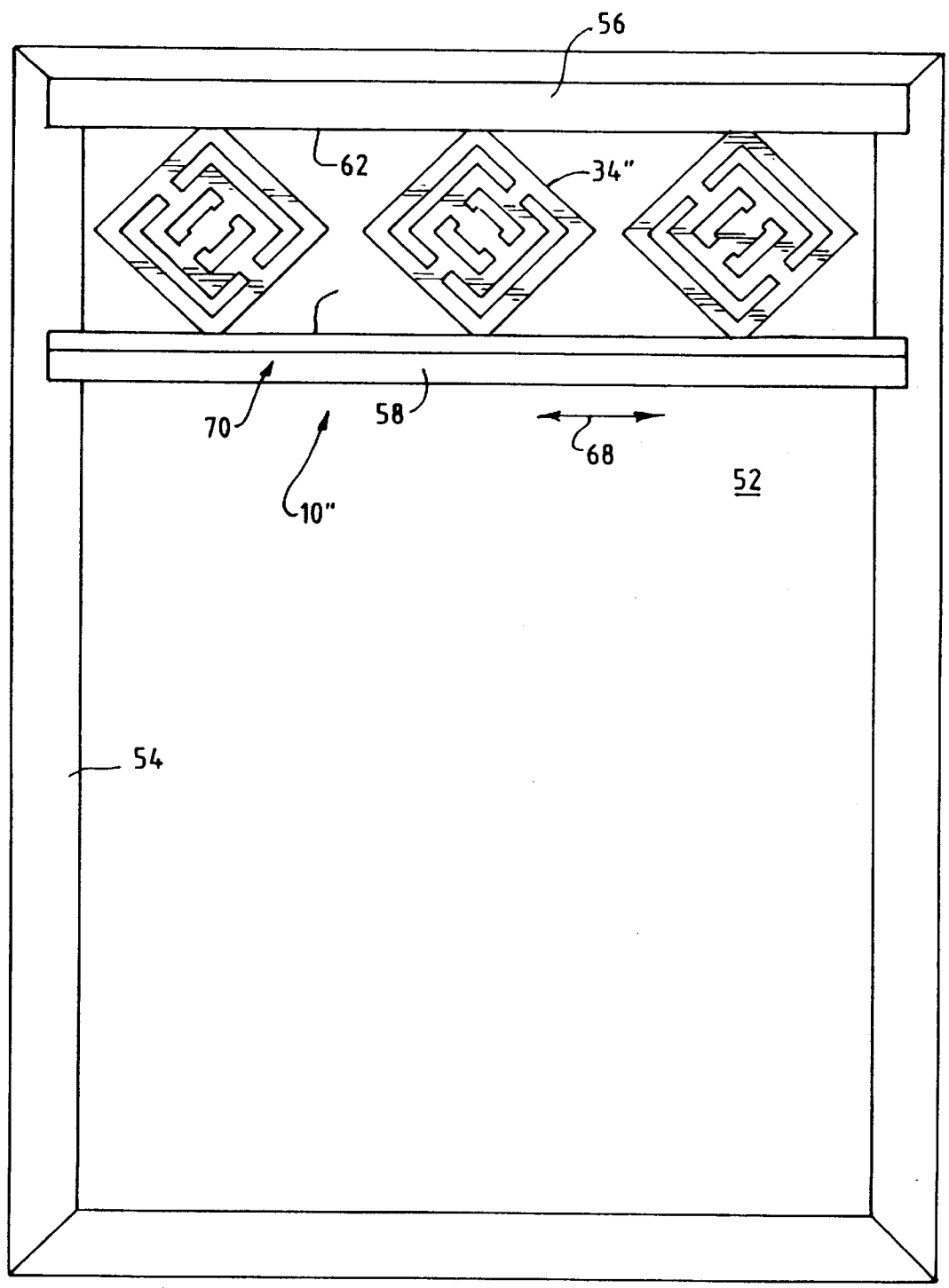
FIG. 15 is a front elevation view of a third embodiment of the decorative assembly of the present invention, including a sash, a frame and exemplary display elements.
Figure 16:
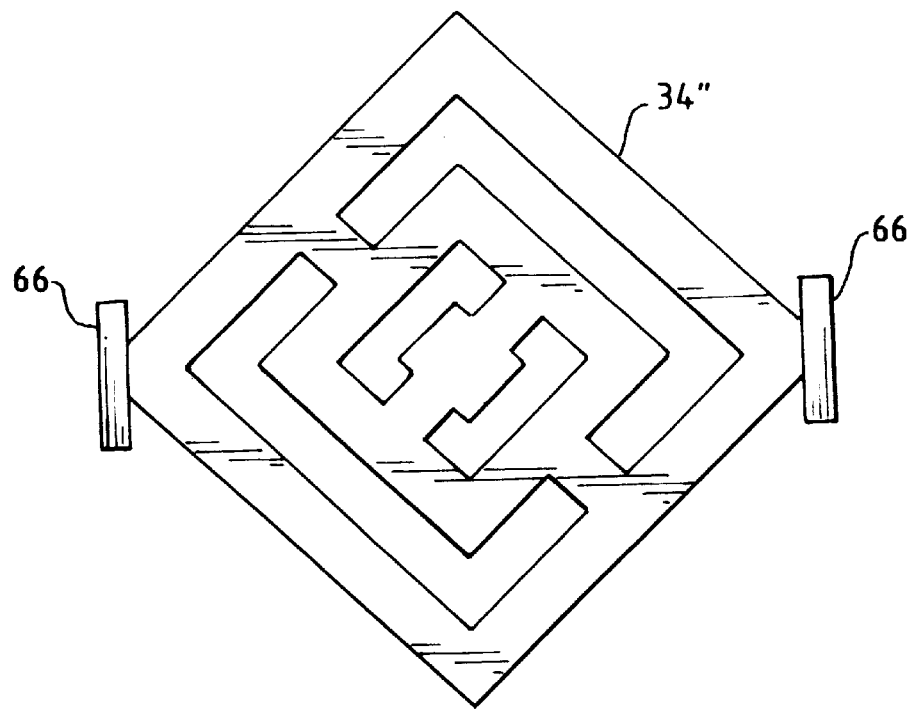
FIG. 16 is an enlarged, front elevation view of the exemplary display element depicted in FIG. 15.
Figure 17:
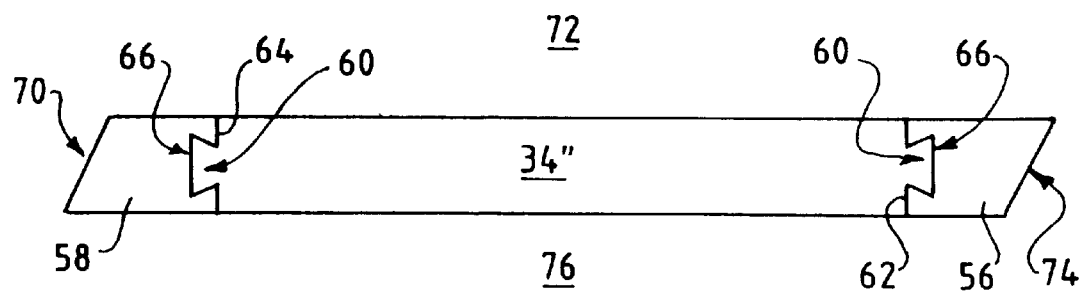
FIG. 17 is an enlarged, side elevation view of the third embodiment of the decorative assembly of the present invention.

Referring now to FIGS. 15–17, a third embodiment of the decorative assembly 10" of the present invention is shown, with like elements having the same reference number and elements which correspond but have been slightly modified indicated with a double prime ("). The decorative assembly 10' includes top 56 and bottom 58 frame elements which are attached to the frame 54. The top 56 and bottom 58 frame elements include dove-tail shaped channels 60 formed on their inside surfaces 62 and 64, respectively, with the channels 60 extending generally the entire length of the frame elements 56,58. The display element 34" includes dove-tail shaped projections 66 extending from opposite sides thereof. The dove-tail connection between the projections 66 on the display element 34" and each of the channels 60 in the top 56 and bottom 58 frame elements, maintains the decorative element 34" in a predetermined relationship while allowing guided sliding translatory movement of the decorative element 34" in the directions of the arrow 68 relative to the top 56 and bottom 58 frame elements.

The bottom frame element 58 includes a bevel 70 formed on the side, shown generally at 72, viewable from the interior of the window, while the top frame element 56 includes a bevel 74 on the side, shown generally at 76, which abuts the window sash 52 and frame 54. It should be noted that both the top 56 and bottom 58 frame elements may also be squared or shaped or designed to match a window manufacturer's specifications for their optional grilles. Further, both the top 56 and bottom 58 frame elements may be bevelled to match a window manufacturer's specifications on a window sash where the styles and rails bevel toward the glass. This will assure a proper fit for the decorative assembly 10" to set into the frame 54 and appear to be a part of the window sash 52.

When the decorative assembly 10,10',10" is mounted to a window 52, the decorative elements 34,34',34" produce silhouettes as the outside light shines in through the window 52. The interchangeability of the decorative elements 34,34', 34" permits a home owner to customize their window treatments, adding personality and comfort to the home. The decorative elements 34,34',34" may be changed in accordance with the holiday seasons to produce a Christmas or Easter decorative theme, or with the change of seasons, or even change or accent the decor of the room. Various themes could include southwestern, animals, nature, florals, sports, arts, music and/or ballet.

While the decorative assembly 10,10',10" is shown attached to a window 52, it should be noted that the decorative assembly 10,10',10" is not intended to be limited to use in this manner. The decorative assembly 10,10',10" can be mounted anywhere in a home or room to add aesthetically pleasing features thereto. For instance, the decorative assembly 10,10',10" could be used as a pot rack, a wall border, or merely as a wall hanging adding aesthetically pleasing features to a room.

While the invention has been described with particular references to the drawings, it should be understood that various modifications can be made without departing from the spirit and scope of the present invention.

I claim:

1. A kit comprising:
   a frame having first and second spaced apart frame elements between which a display space is defined and visible as viewed from a first vantage point;
   a first display element;
   a receptacle and projection defined one each on the first and second frame elements and the first display element cooperating to releasably maintain the first display element in a first predetermined relationship at a first location in the display space,
   the first display element in the first predetermined relationship at the first location performing primarily a decorative function and having a first decorative appearance as viewed from the first vantage point;
   a second display element; and
   a receptacle and projection defined one each on the first and second frame elements and the second display element cooperating to releasably maintain the second display element in a second predetermined relationship at the first location in the display space with the first display element absent from the first location,
   the second display element in the second predetermined relationship at the first location performing primarily a decorative function and having a second decorative appearance as viewed from the first vantage point,
   the first and second display elements capable of being selectively interchangeably displayed at the first location to selectively change the overall decorative appearance of the first and second frame elements as viewed from the first vantage point.

2. The kit of claim 1, wherein the receptacle and projection defined on the first and second frame elements and first display element comprise a dove-tail receptacle and projection.

3. The kit of claim 1, wherein the receptacle and projection defined on the first and second frame elements and second display element comprise a dove-tail receptacle and projection.

4. The kit of claim 1, further in combination with a window having an inner and an outer surface, wherein the first and second frame elements are attached at the inner surface of the window.

5. The kit of claim 1, wherein the first and second spaced apart frame elements are elongate and have inner surfaces facing one another and defining the display space, each inner surface having a channel extending lengthwise along the respective frame element, and wherein the first and second display elements each have a pair of flanges removably receivable one each in the channels for guided sliding translatory movement of the first and second display elements in the display space relative to the first and second frame elements.

6. The kit of claim 5, wherein the first and second display elements are snap-fit to the first and second frame elements.

7. The kit of claim 5, wherein the channels extending lengthwise along the respective frame elements have a female dove-tail configuration and the pairs of flanges on the first and second display elements has a male dove-tail configuration that is complementary to the female dove-tail configuration.

8. The kit of claim 1, wherein the first and second spaced apart frame elements are elongated and have inner surfaces facing one another and defining the display space, each inner surface having a rib extending lengthwise along the respective frame element, and wherein the first and second display elements each have a pair of slots, the ribs removably receivable one each in the slots for guided sliding translatory movement of the first and second display elements in the display space relative to the first and second frame elements.

9. The kit of claim 1, wherein the first decorative appearance of the first display element is different than the second decorative appearance of the second display element.

10. The kit of claim 1, wherein the first and second display elements are non-transparent.

11. A kit comprising:
    a frame having first and second spaced apart frame elements between which a display space is defined and visible as viewed from a first vantage point, each of said first and second frame elements having a length and including a plurality of receptacles/projections defined therein at predetermined locations along each length;
    a first display element;
    a pair of projections/receptacles defined on the first display element selectively cooperating with the receptacles/projections in the first and second frame elements to selectively releasably maintain the first display element in the display space at any of the predetermined locations,
    the first display element at any of the predetermined locations performing primarily a decorative function and having a first decorative appearance as viewed from the first vantage point;
    a second display element; and
    a pair of projections/receptacles defined on the second display element selectively cooperating with the receptacles/projections in the first and second frame elements to selectively releasably maintain the second display element in the display space at any of the predetermined locations,
    the second display element at any of the predetermined locations performing primarily a decorative function and having a second decorative appearance as viewed from the first vantage point,
    the first and second display elements capable of being selectively interchangeably displayed at any of the predetermined locations to change the overall decorative appearance of the first and second frame elements as viewed from the first vantage point.

12. The kit of claim 11, further in combination with a window having an inner and an outer surface, wherein the first and second frame elements are attached to the inner surface of the window.

13. The kit of claim 11, wherein the cooperating projections and receptacles on the first and second display elements and first and second frame elements comprise cooperating dove-tail connections.

14. The kit of claim 13, wherein the first and second display elements are press-fit to the first and second frame elements.

15. The kit of claim 11, wherein the first decorative appearance of the first display element is different than the second decorative appearance of the second display element.

16. The kit of claim 11, wherein the first and second display elements are non-transparent.

17. In combination:
  an enclosed frame defining a display space therebetween visible as viewed from a first vantage point, the enclosed frame including first and second spaced apart frame elements;
  a first display element separate from the enclosed frame;
  a receptacle and projection defined one each on the first and second frame elements and the first display element cooperating to releasably maintain the first display element in a first predetermined relationship at a first location in the display space,
  the first display element in the first predetermined relationship at the first location performing primarily a decorative function and having a first decorative appearance as viewed from the first vantage point;
  a second display element separate from the enclosed frame; and
  a receptacle and projection defined one each on the first and second frame elements and second display element cooperating to releasably maintain the second display element in a second predetermined relationship at the first location in the display space with the first display element absent from the first location,
  the second display element in the second predetermined relationship at the first location performing primarily a decorative function and having a second decorative appearance as viewed from the first vantage point,
  the first and second display elements capable of being selectively interchangeably displayed at the first location to selectively change the overall decorative appearance of the enclosed frame as viewed from the first vantage point.

* * * * *